Oct. 15, 1940.        W. STORRIE        2,218,486
GUIDING ATTACHMENT FOR AUTOMOBILES
Filed Jan. 20, 1939
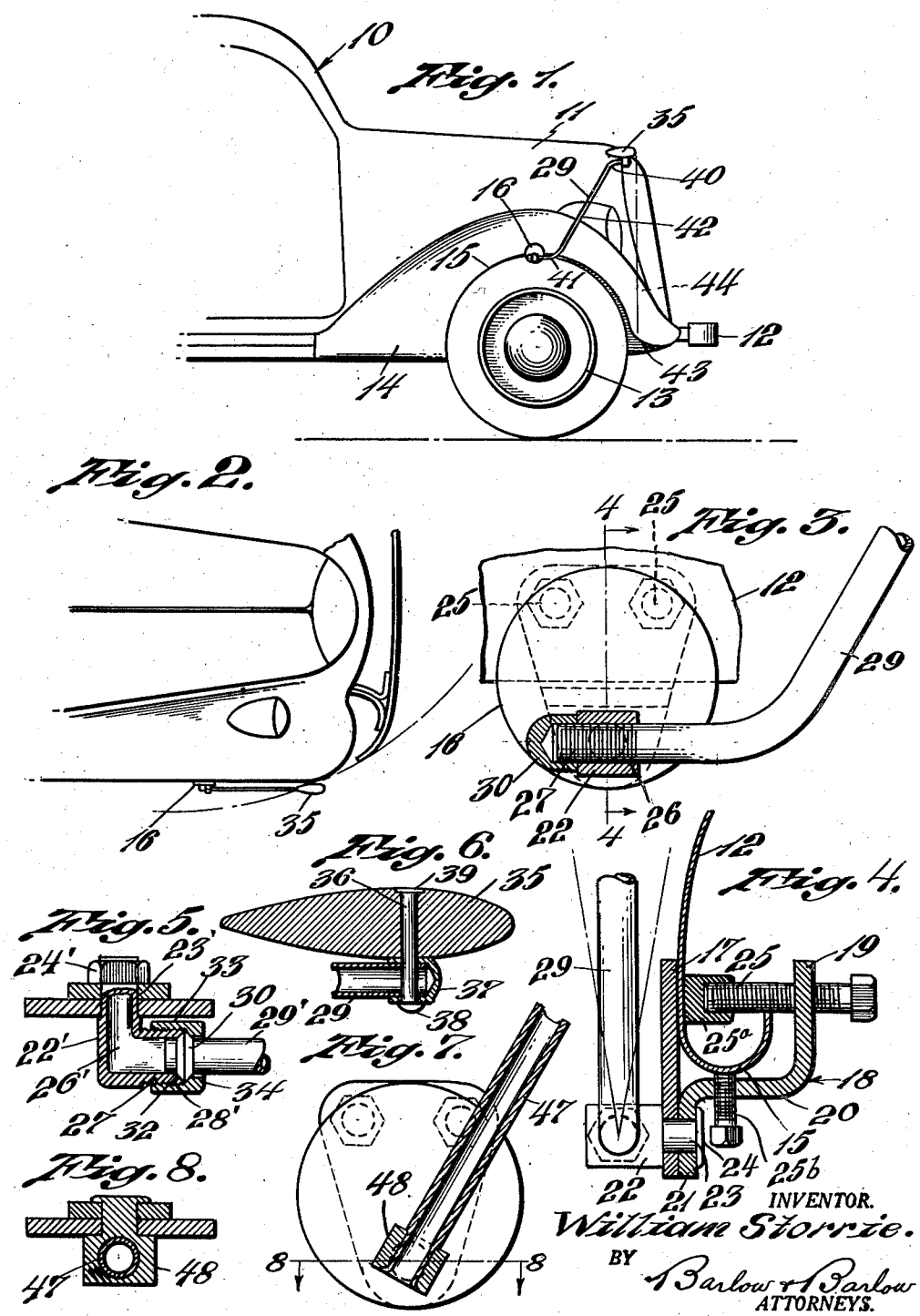
INVENTOR.
William Storrie.
BY Barlow & Barlow
ATTORNEYS.

Patented Oct. 15, 1940

2,218,486

UNITED STATES PATENT OFFICE 2,218,486

GUIDING ATTACHMENT FOR AUTOMOBILES

William Storrie, Providence, R. I., assignor to Apco Mossberg Company, a corporation of Massachusetts Application January 20, 1939, Serial No. 251,900

3 Claims. (Cl. 33—46)

This invention relates to a guiding attachment in connection with an automobile and has for one of its objects to provide a guide which may be attached to the fender or mud guard of an automobile and will be located directly above the point describing the arc of greatest radius when the automobile swings by reason of turning of the front wheels to direct a movement other than in a straight line.

Another object of the invention is to provide a device which will be located at the above indicated desired point but may be clamped to some point other than in the vertical line of its desired position thereby to provide a shorter arm of support than would be necessary were the arm truly vertical.

Another object of the invention is to provide an adjustment so that the relation of the clamping device and the supporting arm may be varied for the accommodation of automobiles of different structures or makes.

Another object of the invention is to provide a support on an incline usually a forward incline with a grip on the mud guard at rearward of the obverse object.

With these and other objects in view, the invention consists of certain novel features of construction, as will be more fully described, and particularly pointed out in the appended claims.

In the accompanying drawing:

Fig. 1 is a side elevational view of a fragmentary portion of an automobile with my guiding attachment secured in position;

Fig. 2 is top plan view of a fragmentary portion of the automobile showing this guiding attachment in position;

Fig. 3 is a fragmentary view showing the attached bracket in side elevation on the mudguard;

Fig. 4 is a section on line 4—4 of Fig. 3;

Fig. 5 is a section of a modified form;

Fig. 6 is a sectional view illustrating an ornament after mounted in position at the upper end of the arm and providing the obverse object of the device;

Fig. 7 is a sectional view of a modified supporting arm and attachment of that arm to the bracket; and Fig. 8 is a sectional view on line 8—8 of Fig. 7.

In the use of an automobile, especially in the parking of the automobile, with the high hood now furnished, it is difficult for a person in the driver's seat to see the location of the mudguard on the distant side of the vehicle and when the wheels are turned for swinging the automobile into or out of a close space, the mudguard often strikes either another automobile or some other object and becomes dented. Various devices to assist the driver in knowing the location of the mudguard have been devised. These devices, so far as I am aware, always extend vertical or substantially vertical from their point of support. In the present day practice of making automobile fenders, the fenders swing down about the forward wheels to such an extent that it is impractical to support any object at the lower forward end of the fender and such guide devices as are attached are usually supported at the upper or top portions of the arc of the fender which extends about the wheel and extend upwardly, vertically from this point and thus are positioned a substantial distance back of the extreme forward end of the mud guard. The extreme forward end of the mud guard is the point describing the arc of greatest radius when swinging of the automobile occurs and in order that this point may be known to the driver, I have provided a guiding attachment which may be secured along the mud guard at any point, but usually at substantially the upper part of the arc of the mud guard with an arm extending from this point of attachment forwardly to a location which will be directly above the forward and outermost end of the mud guard or directly above the point describing the arc of greatest radius which swings with the automobile, and in order to accomplish this result various adjustments are desirable in order that automobiles of different makes may be accommodated; and the following is a more detailed description of the present embodiment of this invention, illustrating the preferred means by which these advantageous results may be accomplished.

With reference to the drawing, 10 designates generally an automobile having a hood 11, a bumper 12, a wheel 13, a mud guard 14, with its arcuate edge designated 15, which arcuate edge is usually rolled inwardly to provide a finished appearance and often provided with some beaded edge although the particular edge is unimportant so far as this invention is concerned. A bracket which may be designated generally 16 consists of a plate 17 to engage the outer surface of the mudguard while an arm of generally Z-shaped structure 18 is secured to this plate 17 and provides a portion 19 spaced from the plate 17, a portion 20 extending toward the plate 17 and a portion 21 to engage the plate 17 and extend therealong. This portion 21 is held securely against the plate by a member 22 having a reduced portion 23 to extend through the plate 17 and portion 21 to be bound in position by riveting and provision of the head 24 as in Fig. 4. Bolts extend through the arm 19 and are capped by a cushion 25a which engages the inner surface of the mudguard and holds the bracket firmly in position on the mudguard to absorb and prevent vibration which might otherwise occur. A set screw 25b extending through the portion 20 engages the rolled edge of the mudguard and assists in steadying the clamp in position. The block 22 has a threaded opening 26 to receive the threaded end 28 of the supporting arm 29 which is held in adjusted position by a cap nut 30 abutting the block 22 and holding the arm in position. In the showing of Fig. 5, the member 22' has a reduced portion 23' held in position by a nut 24', is hollow as at 26 and has a portion 27 extending at right angles therefrom which is threaded as at 28' while the supporting arm 29' is conveniently formed of a cylindrical tube with a flange 30' projecting therefrom, which flange is bound against the abutting surface 32 on the end of the threaded portion 27 by means of a coupling 33 having an inturned edge 34 to engage the other side of the flange 30' and bind it firmly against the threaded end 27 when rotated to tightened engagement.

At the upper end of the arm 29 or 29' I provide an ornament or obverse member 35 which is of elongated or generally cigar streamline bulbous shape, having a length greater than its width to provide a directional element. This ornament may be secured in any suitable manner at the upper end of the arm and I have illustrated it, as provided with a rivet pin 36 to extend through a cap 37 and the upper end of the arm 29 and 29'. This pin is provided with a head 38 at one end and is enlarged as at 39 at the other end to hold the ornament in its desired position. The arm 29 is of generally S-shape, having a horizontal upper portion and a horizontal lower portion 41 with a portion 42 connecting the two and suitably curved in order to provide a graceful line where the incline 42 joins the horizontal upper and lower portions as indicated in Fig. 1.

By this arrangement, the ornament 35 is projected to a position which is directly over a point of the mudguard 43 as indicated by the dot and dash line 44 which point 43 describes the arc of greatest radius when the wheels 13 of the automobile are turned to direct the movement other than in a straight line. This clamping device may be secured at any location along the arc 15 of the mudguard and by loosening the cap nut 30 or the coupling 33, the upper end of the arm 29 or 29' may be moved inwardly or outwardly toward or from the center of the automobile to locate the ornament 35 in different positions relative to its point of attachment. A movement may also be had about the axis of the reduced portion 23 when placed in position as in Fig. 4 or in Fig. 5 by loosening nut 24' so as to swing the inclined arm 29' about axis 23' further forward or nearer to a vertical as may be desired after which the nut 24' may be tightened. In this way I may adjust the device as to height as well as to vertical position and such adjustment affords a means of locating the ornament 35 directly above the point 43 of the mudguard.

Further, in some cases, instead of providing an S-shape arm 29, an arm 47 may be provided which is secured into a block 48 on the bracket by expansion of its lower end 49, this being a somewhat cheaper form although less desirable for some makes of vehicles because of the fact that it cannot be adjusted toward and from the center line of the automobile as above indicated.

The foregoing description is directed solely toward the construction illustrated, but I desire it to be understood that I reserve the privilege of resorting to all the mechanical changes to which the device is susceptible, the invention being derived and limited only by the terms of the appended claims.

I claim:

1. In combination with an automobile having steerable wheels, a manual steering wheel for steering said wheels and a mud guard or fender of arcuate form with a downwardly extending forward portion containing a point along its edge which will describe an arc of greatest radius upon rolling movement of the automobile with the wheels inclined to a straight line, of a driving guide comprising a clamp secured to the edge of the mud guard at a location higher than and rearwardly of said point along its edge, an arm extending upwardly and forwardly from the clamp, and an obverse guide member at the upper forward portion of the arm in substantially a position vertically over the said point of the mud guard that describes said arc of greatest radius.

2. In combination with an automobile having steerable wheels, a manual steering wheel for steering said wheels and a mud guard or fender of arcuate form with a downwardly extending forward portion containing a point along its edge which will describe an arc of greatest radius upon rolling movement of the automobile with the wheels inclined to a straight line, of a driving guide comprising a clamp secured to the edge of the mud guard at a location higher than and rearwardly of said point along its edge, an S-shaped arm extending upwardly and forwardly from the clamp, and an obverse guide member at the upper forward portion of the arm in substantially a position vertically over the said point of the mud guard that describes said arc of greatest radius.

3. In combination with an automobile having steerable wheels, a manual steering wheel for steering said wheels and a mud guard or fender of arcuate form with a downwardly extending forward portion containing a point along its edge which will describe an arc of greatest radius upon rolling movement of the automobile with the wheels inclined to a straight line, of a driving guide comprising a clamp secured to the edge of the mud guard at a location higher than and rearwardly of said point along its edge, an S-shaped arm extending upwardly and forwardly from the clamp, means to adjustably secure said arm to said clamp, and an obverse guide member at the upper forward portion of the arm in substantially a position vertically over the said point of the mud guard that describes said arc of greatest radius.

WILLIAM STORRIE.